(12) United States Patent
Fang et al.

(10) Patent No.: US 10,327,053 B2
(45) Date of Patent: Jun. 18, 2019

(54) BLUETOOTH SPEAKER

(71) Applicant: UBTECH Robotics Corp., Shenzhen (CN)

(72) Inventors: Xiongyuan Fang, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 90 days.

(21) Appl. No.: 15/607,476

(22) Filed: May 27, 2017

(65) Prior Publication Data

US 2018/0192171 A1   Jul. 5, 2018

(51) Int. Cl.
*H04R 1/02* (2006.01)
*H04B 5/02* (2006.01)
*H04W 4/80* (2018.01)
*H04R 3/00* (2006.01)

(52) U.S. Cl.
CPC .............. *H04R 1/02* (2013.01); *H04B 5/02* (2013.01); *H04W 4/80* (2018.02); *H04R 3/00* (2013.01); *H04R 2420/07* (2013.01)

(58) Field of Classification Search
CPC combination set(s) only.
See application file for complete search history.

(56) References Cited

U.S. PATENT DOCUMENTS

| | | | |
|---|---|---|---|
| 9,369,559 B1 * | 6/2016 | Leventhal | H04M 1/6041 |
| 2012/0223083 A1 * | 9/2012 | Hug | B65D 25/04 |
| | | | 220/507 |
| 2013/0109267 A1 * | 5/2013 | Schweikardt | A63H 33/04 |
| | | | 446/85 |
| 2015/0324687 A1 * | 11/2015 | Buibas | G06N 3/08 |
| | | | 706/23 |
| 2017/0160455 A1 * | 6/2017 | Rasmussen | G02B 6/0008 |

* cited by examiner

*Primary Examiner* — Zhitong Chen

(57) ABSTRACT

A Bluetooth speaker includes an upper case and a lower case. The upper case and the lower case corporately define a receiving space, and the upper case and the lower case each include a mounting portion for connecting with a building block element. A circuit board, a loudspeaker, a Bluetooth module and a light emitting module are received in the receiving space, and the loudspeaker, the Bluetooth module and the light emitting module are electrically connected to the circuit board.

8 Claims, 4 Drawing Sheets

BLUETOOTH SPEAKER

CROSS REFERENCE TO RELATED APPLICATIONS

This application claims priority to Chinese Patent Application No. 201611266124.X, filed Dec. 31, 2016, which is hereby incorporated by reference herein as it set forth in its entirety.

BACKGROUND

1. Technical Field

The present disclosure generally relates to speakers, and particularly to a Bluetooth speaker.

2. Description of Related Art

With the development of technology, building block robots have been widely found in people's lives. Some conventional building block robots include various modules, such as main controllers, servos, connectors and decorative members, to build a variety of different figures. The robots controlled by the servos can perform a variety of actions. Conventional building block elements can meet the basic requirement of creating robots of different shapes. It is desired if the conventional building block elements can provide more functions.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
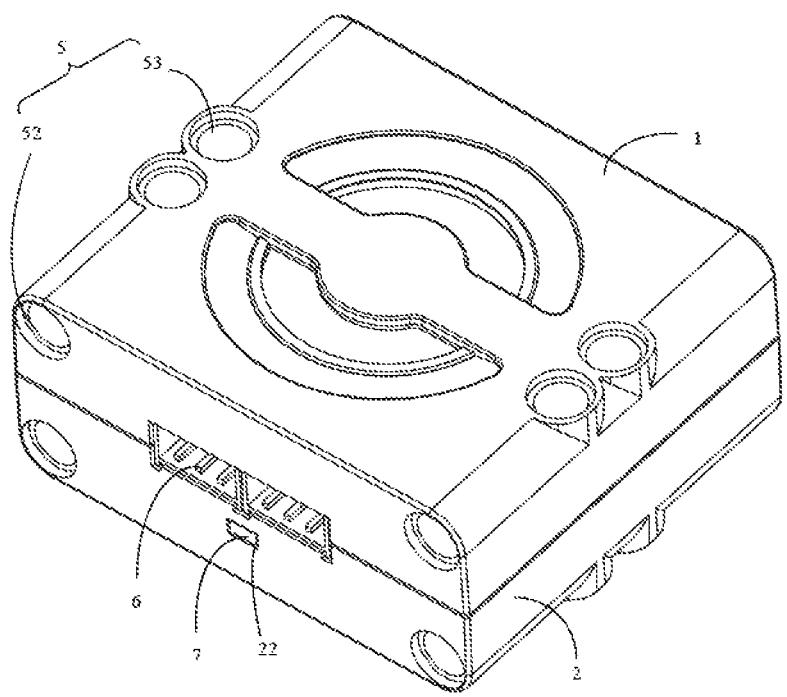
FIG. 1 is an isometric view of a Bluetooth speaker according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
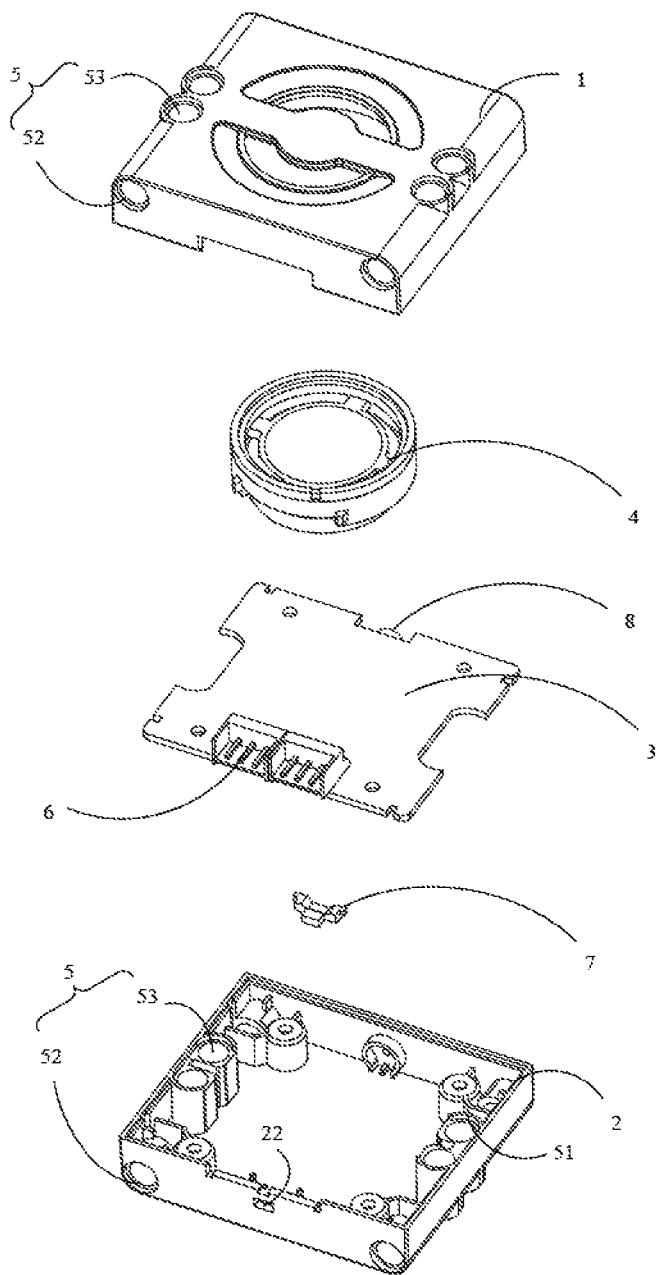
FIG. 2 is an exploded isometric view of the Bluetooth speaker of FIG. 1.
Figure 3:
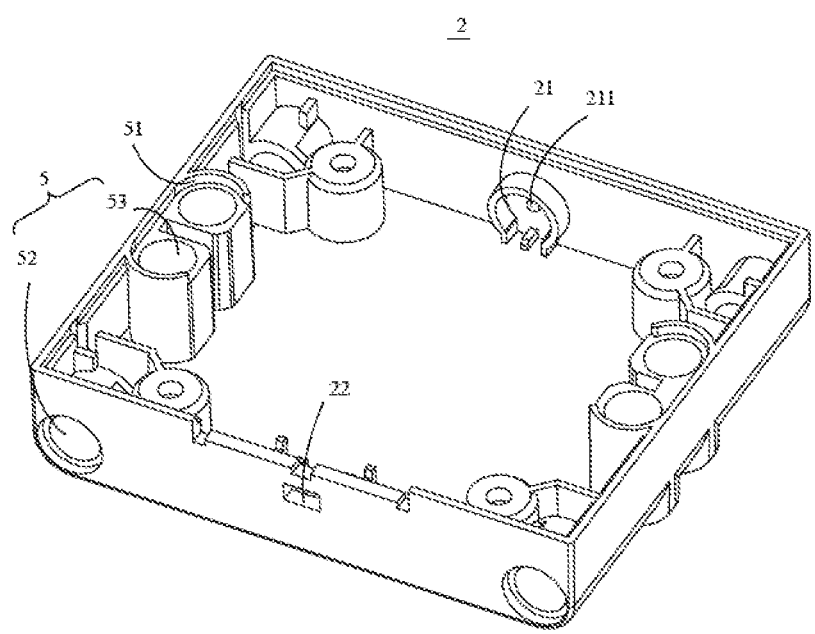
FIG. 3 is an isometric view of a lower case of the Bluetooth speaker of FIG. 1.

Referring to FIGS. 1-3, in one embodiment, a Bluetooth speaker includes an upper case 1 and a lower case 2. The upper case 1 and the lower case 2 corporately define a receiving space, and the upper case 1 and the lower case 2 each include a mounting portion 5 for connecting with a building block element. A circuit board 3, a loudspeaker 4, a Bluetooth module (not labeled) and a light emitting module (not labeled) are received in the receiving space. The loudspeaker 4, the Bluetooth module and the light emitting module are electrically connected to the circuit board 3.

In the Bluetooth speaker of the embodiment, the circuit board 3, the loudspeaker 4, the Bluetooth module and the light emitting module are received in the receiving space defined by the upper case 1 and the lower case 2, and the upper case 1 and the lower case 2 each include a mounting portion 5 for connecting with a building block element. When a building block robot needs a Bluetooth speaker, the Bluetooth speaker of the embodiment can be attached to the robot by the engagement of one or more mounting portions 5 with the building block elements of the robot. When the Bluetooth module wirelessly receives audio signals from an external device, the Bluetooth module will process and output the audio signals to the loudspeaker 4. When the Bluetooth speaker function is not needed, the Bluetooth speaker can be detached from the building block robot.

In one embodiment, the mounting portions 5 are post-shaped. When attaching the Bluetooth speaker to other building block elements, the post-shaped mounting portions 5 are easy to assemble and can improve the assembling efficiency. Further, the mounting portions 5 may be cylindrical, which facilitates the connection of the Bluetooth speaker with other building block elements.

As shown in FIG. 3, in one embodiment, some of the mounting portions 5 each include a protrusion 51 with one end connected to a side wall of the lower case 2, which enhances the strength of the mounting portions 5.

Referring again to FIG. 3, in one embodiment, the mounting portions 5 include a number of first, horizontal mounting portions 52 and a number of second, vertical mounting portions 53, which allows the Bluetooth speaker to be connected with other building block elements in different manners. With the horizontal mounting portions 52 and the vertical mounting portions 53, the Bluetooth speaker can be connected with other building block elements at different orientations according to actual need.

In one embodiment, the Bluetooth speaker further includes one or more closed or semi-closed interfaces 6. The semi-closed interface 6 is designed to facilitate connection of signal lines to the interface 6. It is to be understood that the closed interface 6 is designed to prevent dust from entering the interface 6 or prevent the interface 6 from being contaminated. In the embodiment, two interfaces 6 are arranged side by side on the circuit board 3 for connecting the Bluetooth speaker to an external device.

In one embodiment, the Bluetooth speaker further includes a microphone 8 which is electrically connected to the circuit board 3 so that the Bluetooth speaker can acquire and process audio signals. For example, the microphone 8 transmits the received audio signals to the circuit board 3, the control module on the circuit board 3 then controls the operation of the other building block elements to complete the action instructed by the audio signals, or the Bluetooth speaker transmits the audio signals collected by the microphone 8 to a mobile terminal, such as a mobile phone. The mobile terminal completes the analysis of voice signals, and then controls the other building block elements to perform the corresponding action. When the Bluetooth functionality of the Bluetooth speaker is enabled, a user can wirelessly connect the Bluetooth speaker to a Bluetooth-enabled cell phone. The cell phone can then be used to control the building block robot to perform actions while outputting music through the Bluetooth speaker.

Figure 4:
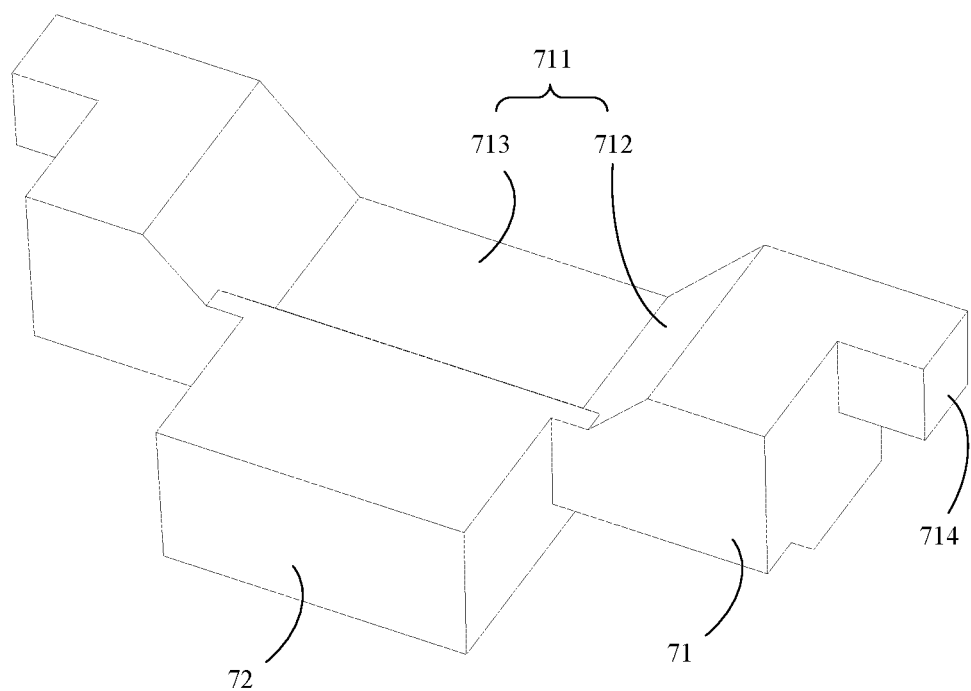
FIG. 4 is an isometric view of a light guide of the Bluetooth speaker of FIG. 1.

The lower case 2 defines a mounting cavity 21 for mounting the microphone 8 therein, and a through hole 211 that communicates the mounting cavity 21 with the outside of the lower case 2, such that the microphone 8 can receive sound from outside. As shown in FIGS. 1-2 and 4, in one embodiment a light guide 7 is arranged in the receiving space and is used to guide the light emitted from the light emitting module to an outside of the Bluetooth speaker. The light emitting module may include a number of LEDs for indicating the operation state of the Bluetooth speaker.

In one embodiment, the light guide 7 is connected to the lower case 2 by press-fit, snap-engagement or other suitable connection means. The light guide 7 is made of light-transmitting material, and the light emitted from the LEDs is guided to the outside of the Bluetooth speaker through the light guide, and the light is clearly visible to the outside of the Bluetooth speaker, which indicates the operation state of the Bluetooth speaker.

As shown in FIG. 4, the light guide includes a first guiding portion 71 and a second guiding portion 72 connected to the first guiding portion 71. The first guiding portion 71 defines a recess 711, and side walls 712 of the recess 711 are slant. The side walls 712 extend from one end of the first guiding portion 71 to an inner sidewall of the second guiding portion 72. Compared with vertical side walls, the slant side walls 712 of the recess 711 have the advantage of low manufacturing cost and simple manufacturing process. As shown in FIG. 4, the second guiding portion 72 is received in a through hole 22 of the lower case 2 so as to be exposed to an outside of the lower case 2.

In one embodiment, the angles between each of the side walls 712 and the bottom 713 of the recess 711 are obtuse angles. With such arrangement, it can save raw material and reduce material cost.

In one embodiment, each of opposite sides of the first guiding portion 71 includes a protrusion 714. The lower case 2 defines grooves (not labeled) corresponding to the protrusions 714. When the light guide 7 and the lower case 2 are assembled, the second guiding portion 72 is orientated to face the outside the Bluetooth speaker, and the projections 714 are caused to be engaged with the grooves of the lower case 2, thereby connecting the light guide 7 to the lower case 2.

In the Bluetooth speaker of the embodiment, the circuit board 3, the loudspeaker 4, the Bluetooth module and the light emitting module are received in the receiving space defined by the upper case 1 and the lower case 2, and the upper case 1 and the lower case 2 each include a mounting portion 5 for connecting with a building block element. When a building block robot needs a Bluetooth speaker, the Bluetooth speaker of the embodiment can be attached to the robot by the engagement of one or more mounting portions 5 with the building block elements of the robot. When the Bluetooth module wirelessly receives audio signals from an external device, the Bluetooth module will process and output the audio signals to the loudspeaker 4. When the Bluetooth speaker function is not needed, the Bluetooth speaker can be detached from the building block robot.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A speaker comprising:
an upper case and a lower case, the upper case and the lower case corporately defining a receiving space, and the upper case and the lower case each comprising a mounting portion for connecting with a building block element;
a circuit board, a loudspeaker, a wireless module and a light emitting module that are received in the receiving space, and the loudspeaker, the wireless module and the light emitting module are electrically connected to the circuit boarding; and
a light guide configured to guide the light emitted from the light emitting module to an outside of the speaker;
wherein the light guide comprises a first guiding portion and a second guiding portion connected to the first guiding portion, and the first guiding portion defines a recess, and side walls of the recess are slant, the side walls of the recess extend from one end of the first guiding portion to an inner sidewall of the second guiding portion, the second guiding portion is received in a through hole of the lower case so as to be exposed to an outside of the lower case.

2. The speaker of claim 1, wherein the mounting portions are post-shaped.

3. The speaker of claim 1, wherein the mounting portions comprise a plurality of first, horizontal mounting portions and a plurality of second vertical, mounting portions.

4. The speaker of claim 1 further comprising one or more interfaces for transmitting electrical signals.

5. The speaker of claim 1, wherein the light guide is connected to the lower case.

6. The speaker of claim 1 further comprising a microphone electrically connected to the circuit board.

7. The speaker of claim 6, wherein the lower case defines a mounting cavity for mounting the microphone therein, and a through hole that communicates the mounting cavity with an outside of the lower case.

8. The speaker of claim 1, wherein each of opposite sides of the first guiding portion comprises a protrusion.

* * * * *